US005658124A

United States Patent [19]
Presnell, III

[11] Patent Number: 5,658,124
[45] Date of Patent: Aug. 19, 1997

[54] RUG HOIST

[76] Inventor: Samuel C. Presnell, III, 7976 Cooper Rd., Cincinnati, Ohio 45242

[21] Appl. No.: 584,570

[22] Filed: Jan. 8, 1996

[51] Int. Cl.$^{6}$ .......... B65G 49/00

[52] U.S. Cl. .......... 414/786; 414/11; 414/911; 414/589

[58] Field of Search .......... 414/589, 590, 414/10, 11, 910, 911, 786; 212/330; 193/35 C; 187/243, 244; 254/133 R, 2 R, 93 H; 269/289 MR

[56] References Cited

U.S. PATENT DOCUMENTS

| | | | |
|---|---|---|---|
| 2,828,870 | 4/1958 | Corley | 414/11 |
| 4,715,760 | 12/1987 | Browning | 254/93 H |
| 4,987,976 | 1/1991 | Daugherty | 187/243 |
| 5,337,875 | 8/1994 | Lee | 269/289 MR |
| 5,383,758 | 1/1995 | Patrick | 414/10 X |

FOREIGN PATENT DOCUMENTS

| | | | |
|---|---|---|---|
| 610665 | 10/1960 | Italy | 193/35 C |

*Primary Examiner*—Donald W. Underwood
*Attorney, Agent, or Firm*—Wood, Herron & Evans, L.L.P.

[57] ABSTRACT

A rug hoist and method of use thereof enables a single operator to conveniently and safely suspend a rug from an elevated display rack. In a presently preferred embodiment, the hoist includes a pneumatically operated telescoping lift having a carriage with a V-shaped trough mounted on top thereof. The rug to be suspended on the display rack is rolled into a tubular configuration and mounted onto the carriage. The pneumatic lift then elevates the rug toward an upper mounting bar of the display rack so that a free edge of the rug can be safely and conveniently clipped to the mounting bar by a single individual. Once it is attached to the display rack, the rug hoist lowers the carriage and thereby unrolls the rug into a planar and generally vertical orientation for display on the rack.

16 Claims, 3 Drawing Sheets

RUG HOIST

BACKGROUND OF THE INVENTION

This invention relates to an apparatus and method for displaying rugs and more particularly an apparatus and method for hanging rugs for full display.

Retailers of area rugs frequently use elevated display racks to suspend and display area rugs. Typically, the area rugs measure 8 feet by 10 feet or 9 feet by 12 feet and commonly weigh anywhere from about 50 pounds to about 150 pounds. The display racks suspend the rugs in a generally planar vertical orientation with a number of rugs being suspended generally parallel to each other on a single display rack. An upper free edge of each rug is attached to a mounting bar of the display rack and the rug hangs vertically downward. The mounting bar and rug attached thereto can be pivoted about a generally vertical axis to provide access to and viewing of other rugs similarly suspended on the display rack. Display racks of this type are commonly used by retailers in stores, showrooms or the like to enable convenient viewing of the entire surface of numerous area rugs in a relatively compact space.

One problem associated with display racks for area rugs as described is the ability to safely, easily and conveniently lift and attach the rug to the display rack. Due to the size of the rugs themselves, the mounting bar to which the upper edge of the rug is attached is typically at least 12 feet above the floor. Furthermore, the rugs are usually in a rolled or tubular configuration for compact and convenient storage, shipping, and/or transport of the individual rugs. As a result, the rolled rug is typically 8 to 9 feet in length and weighs as much as about 150 pounds.

A current practice is for two or more individuals to position separate ladders below the mounting bar, collectively lift the rolled rug and climb their respective ladder while holding the rug. After each of the individuals is within reach of the elevated mounting bar, the rug is partially unrolled thereby exposing a free edge of the rug which is positioned proximate the mounting bar so that it can be clipped or otherwise attached thereto. While the rug is being attached to the mounting bar of the display rack, the individuals must simultaneously continue to hold the rug while balancing themselves and the rug atop the ladder. Each worker typically holds the rug with one hand while attempting to clip or attach the free edge of the rug to the mounting bar with another hand. Once the rug is attached to the mounting bar, each of the workers must gradually descend their respective ladders while unrolling the rug downwardly into the generally vertical and planar display configuration.

It will be appreciated that the above described technique for suspending an area rug on an elevated display rack is very time consuming, labor intensive, and requires at a minimum two people to accomplish the task. Additionally, it is potentially dangerous to the workers due to the weight of the rug and the elevated height at which the workers must hold the rug while attaching it to the display rack. Furthermore, the display racks are commonly located in a retail showroom and the above described operation must be accomplished in as quiet and unobtrusive manner as possible so as not to disrupt or annoy nearby customers and the like.

Accordingly, it has therefore been a primary objective of this invention to provide an improved apparatus and method to facilitate full display of a rug in a vertical orientation.

It has been a further objective of this invention to provide such an apparatus and method so that the rug can be attached to a display rack in a timely, safe and quiet manner.

It has been a still further objective of this invention that the operation of attaching and displaying the rug on the elevated display rack can be accomplished by a single individual.

SUMMARY OF THE INVENTION

These and other objectives of the invention have been attained in one embodiment by a rug hoist which enables a single individual to conveniently transfer a rolled area rug onto a carriage of the rug hoist, raise the rug with the hoist toward an elevated mounting bar of a display rack, attach a free edge of the rug to the mounting bar and then unroll the rug downwardly for display. Furthermore, the rug is supported on the carriage in an elevated position thereby freeing both hands of the worker to safely and efficiently attach an edge of the rug to the mounting bar with clips or the like. After the rug is attached to the mounting bar, the carriage is conveniently lowered by the operator thereby allowing the rug to gradually unroll into a generally planar and vertical display configuration.

In a presently preferred embodiment of the rug hoist, a generally V-shaped carriage is mounted atop a pneumatic telescoping elevator. The pneumatic elevator is operatively connected to a pressurized air source such as a tank or compressor to enable the elevator to selectively raise and lower the carriage as required. The V-shaped carriage is pivotally mounted atop the elevator so that it can be pivoted between a generally horizontal operational configuration and a generally vertical storage configuration. The presently preferred embodiment of the V-shaped carriage includes a plurality of rollers on an inner surface thereof so that the rolled rug can be easily and slidably loaded onto the carriage from a storage bin or position by a single operator. The elevator is mounted atop a wheeled base so that it can be easily positioned and repositioned as required proximate a storage bin and then below the mounting bar of the display rack. Once the rolled rug is mounted onto the carriage and the rug hoist is positioned below the mounting bar of the display rack, the rug and carriage are raised toward the mounting bar by operation of the elevator. The operator climbs a ladder and simply attaches the free edge of the rug to the mounting bar while the rolled rug is supported on the carriage of the hoist. After the free edge of the rug is attached to the mounting bar, the operator merely lowers the carriage thereby unrolling the rug into the display configuration.

It will be appreciated that the rug hoist of this invention provides a safe, efficient and quiet apparatus and method for a single operator to attach a rolled rug to an elevated display rack.

BRIEF DESCRIPTION OF THE DRAWINGS

Further objectives and features of the invention will become more readily apparent from the following detailed description taken in conjunction with the accompanying drawings in which.

DETAILED DESCRIPTION OF THE INVENTION

Figure 1:
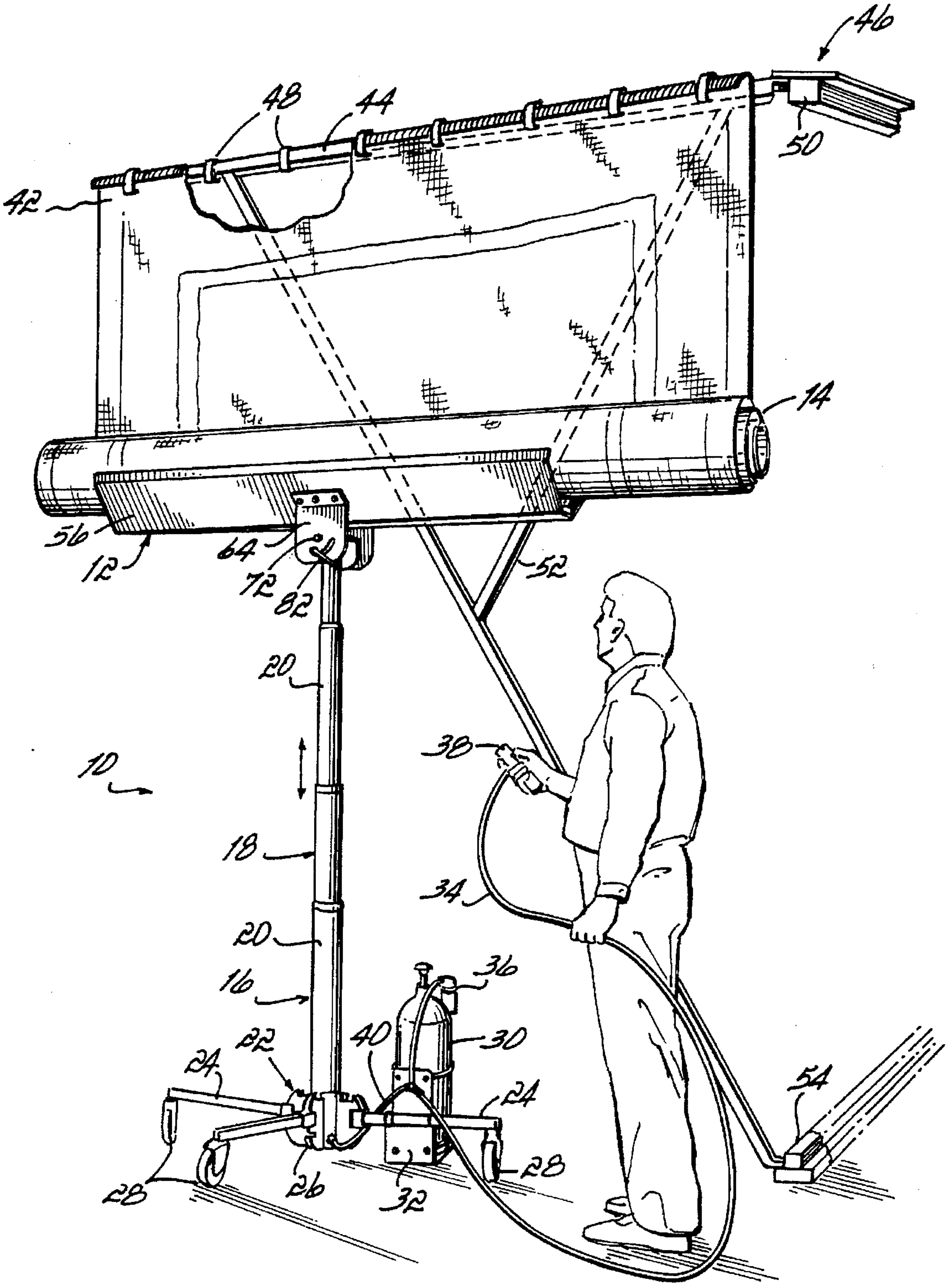
FIG. 1 is a perspective view of an operator lowering an area rug attached to an elevated mounting bar of a display rack with a rug hoist according to a presently preferred embodiment of this invention.

A presently preferred embodiment of a rug hoist 10 according to this invention is shown in FIG. 1. The hoist 10 includes a generally V-shaped trough or carriage 12 which supports a rolled area rug 14 or the like. Typically, the rug 14 weighs approximately 50 to approximately 150 pounds and when unrolled into a generally planar configuration measures on the order of 8 feet by 10 feet or 9 feet by 12 feet. It will be appreciated by one of ordinary skill in the art that the present invention is not limited to area rugs of any particular size or weight, but the present examples are cited because they are common in the industry.

The carriage 12 is mounted at the upper end of an elevator 16 which in a presently preferred embodiment comprises a pneumatically actuated telescoping lift 18 having a plurality of nested concentric telescoping posts 20. The lift 18 is mounted atop a base 22 having a plurality of legs 24 projecting outwardly from a hub 26 of the base 22. A castor wheel assembly 28 is mounted proximate an outer end of each leg 24 and the castor wheels 28 enable the rug hoist 10 to be easily moved about and repositioned as required.

The telescoping lift 18 is operably connected to an air tank 30 which is mounted on a dolly 32 secured to one of the legs 24 of the base 22. A control hose 34 is connected between a pneumatic controller 36 on the tank 30 and a handheld actuator 38 operable by a user of the rug hoist 10 to raise and lower the carriage 12. A feed hose 40 is operably connected to the base 22 of the elevator 16 to supply air to the lift 18 as required.

An upper free edge 42 of the rug 14 is attached to a mounting bar 44 of a display rack 46 by a plurality of clips 48 as shown in FIG. 1. The mounting bar 44 is pivotally connected at one end to a ceiling mount 50. The mounting bar 44 is supported by a Y-shaped brace 52 which is pivotally connected at a lower end to a floor mount 54. The pivotal connection between the mounting bar 44 and the ceiling mount 50 and between the Y-shaped brace 52 and the floor mount 54 enable the display rack 46 and rug 14 suspended therefrom to be pivoted for more convenient access or viewing of the rugs on the display rack 46. A plurality of mounting bars and associated support braces are typically provided on a given display rack as described.

Figure 2:
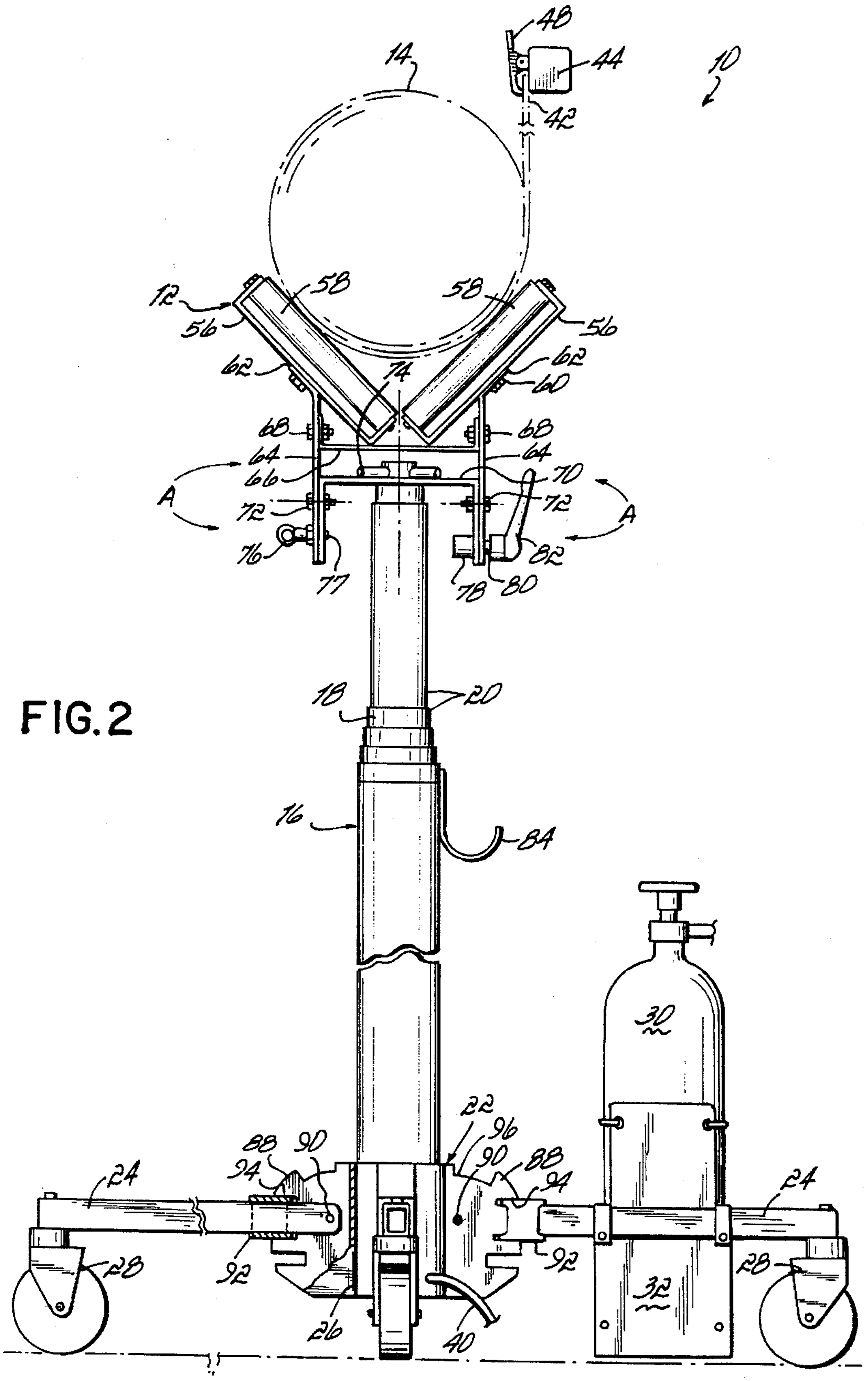
FIG. 2 is a side view of the rug hoist of FIG. 1 illustrating a rolled rug positioned on the carriage in a generally horizontal configuration.

FIG. 2 shows a side view of the rug hoist 10 in which the V-shaped carriage 12 comprises a pair of U-shaped top frame members 56 which are oriented approximately 90° with respect to each other to form the V-shape of the trough. A plurality of rollers 58 are mounted between the opposing upstanding arms of each frame member 56. The rollers 58 are mounted for rotation so that the rolled rug 14 can be easily and slidably loaded onto the carriage 12. The rollers 58 minimize the friction generated between the carriage 12 and the rug 14. In a presently preferred embodiment, the carriage 12 extends approximately 70.5 inches in length and each top frame member 56, contains 24 nine inch long aluminum rollers 58 approximately evenly spaced along each top frame member 56.

Each of the top frame members 56 is secured with a bolt 60 or other fastener to an upper flange 62 of an associated side frame member 64. An upwardly open U-shaped spacer 66 is secured with bolts 68 or other fasteners between the opposed side frame members 64 and underlies the top frame members 56. A generally U-shaped downwardly oriented pivot bracket 70 is also secured with bolts 72 or other fasteners between the side frame members 64 and below the spacer 66. The pivot bracket 70 supports the carriage 12 atop the uppermost telescoping post 20 and is secured to the uppermost end of the post by a pin 74. The pivot bracket 70 and pin 74 permit the carriage 12 to be rotated about the lift 18 as indicated by arrows A in FIG. 2 for proper orientation of the carriage 12 and rug 14 supported thereon.

A locking mechanism comprising spring loaded ring handle 76 and associated post 77 are located on one side of the pivot bracket 70 and associated side frame member 64 and a nut 78 which receives a stem 80 having a handle 82 connected on the opposite side thereof are positioned on the other side of the pivot bracket 70 and associated side frame member 64. The function and operation of the handle assembly and locking mechanism will be described in detail with reference to FIG. 3. A hook 84 is mounted on the lowermost telescoping post 20 of the lift 18 and provides a convenient place from which to suspend the hose 34 when the rug hoist 10 is not in use. The free edge 42 of the rolled rug 14 is shown in FIG. 2 attached to the mounting bar 44 of the display rack 46 by the plurality of clips 48. It will be appreciated by one of ordinary skill in the art that other mechanisms for securing the rug to the display rack and other display rack designs are within the scope of this invention.

Figure 3:
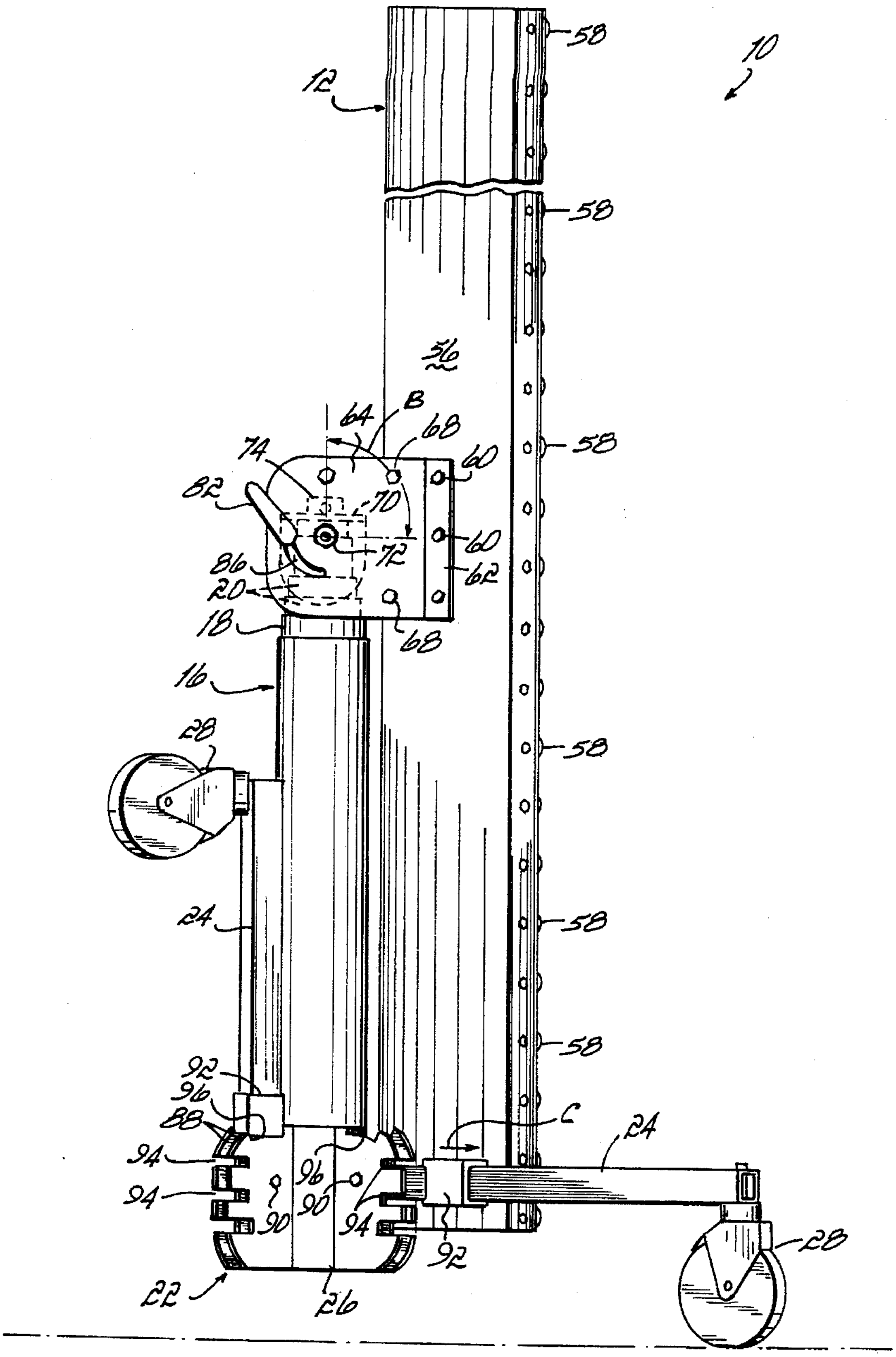
FIG. 3 is a front view of the rug hoist with the carriage pivoted to a vertical, storage configuration with one leg of the base of the hoist pivoted upwardly to a collapsed configuration.

FIG. 3 is a front view of the rug hoist 10 with the carriage 12 pivoted to the generally vertical position for storage, transportation or the like. The pivotal movement of the carriage. 12 in the directions of arrow B is facilitated by rotation of the handle 82 to loosen the nut 78 with respect to the attached stem 80 and thereby permit the side frame members 64 to slidably pivot about the bolts 72 relative to the pivot bracket 70 (FIG. 2). Once the nut 78 is loosened by rotation of the handle 82, the side frame members 64 are free to pivot relative to the pivot bracket 70 with the stem 80 translating within an arcuate slot 86 in the side frame member 64 as shown in FIG. 3. The side frame members 64 pivot about the bolts 72 which join the side frame members 64 to the pivot bracket 70. Preferably, the arcuate slot 86 extends approximately 90° thereby enabling the carriage 12 to be pivoted from a generally horizontal operational position to a generally vertical storage position.

After the carriage 12 is pivoted to the storage position of FIG. 3, the handle 82 is reversibly rotated thereby tightening the nut 78 and stem 80 and securing the carriage 12 in the vertical position until such time as the rug hoist 10 is to be used at which time the handle 82 once again loosened and the carriage 12 is pivoted to the horizontal position. The ring handle 76 of the locking mechanism on the opposite side frame member 64 is biased toward a locking position so that the carriage 12 is maintained in the horizontal operational position. This provides a safety to inhibit the horizontal carriage 12 from pivoting downwardly when the rug 14 is supported thereon. Pulling outwardly on the ring handle 76 overcomes the locking bias and disengages the locking mechanism thereby permitting the carriage 12 to pivot downwardly as previously described.

As shown in FIG. 3, each leg 24 of the base 22 is pivotally connected to a pair of spaced flanges 88 on the hub 26 by a pivot pin 90. A collar 92 is slidably mounted on the leg 24 and is received within slots 94 on the opposing flanges 88 of the hub 26. In use, each leg 24 is pivoted downwardly to a generally horizontal position with the castor wheel 28 contacting the ground and the collar 92 being slidably inserted into the slots 94 thereby locking the leg 24 into the horizontal position. As shown in FIG. 3, one or more of the legs 24 may be pivoted upwardly to provide for compact storage of the rug hoist 10. The legs 24 are pivoted upwardly by sliding the collar 92 outwardly from the hub 26 thereby disengaging the collar 92 from the slots 94 and the flanges 88 as shown by arrow C in FIG. 3. After the collar 92 is disengaged from the hub 26, the associated leg 24 is pivoted upwardly to a generally vertical position and the collar 92 is slid downwardly to be received within a storage notch 96 on each of the flanges 88 and secure the leg 24 in the storage position.

To return each of the legs 24 to the horizontal position, the collar 92 is slid upwardly on the leg 24 thereby disengaging it from the storage notch 96, the leg 24 is pivoted downwardly until the castor wheel 28 contacts the ground and the leg 24 is generally horizontal enabling the collar 92 to be slid toward the hub 26 to engage the flange slots 94 as previously described.

In a presently preferred embodiment, the elevator 16 comprising the pneumatically operated telescoping lift 18 and base 22 of the rug hoist 10 is commercially available from Genie Industries as Genie Superlift, Part No. 32306.

In operation, the rug hoist 10 is conveniently rolled from a storage location to the display rack 46 and positioned below the mounting bar 44 upon which the rug 14 will be suspended. Conveniently, the area rug 14, which is rolled into a tubular configuration, is slidably received on the carriage 12. The rug hoist 10 and rolled rug 14 can be transported about the showroom as a unit and positioned proximate the display rack 46 thereby enabling a single worker to easily move the rolled rug 14. After the rolled rug 14 on the rug hoist 10 is positioned proximate the display rack 46, the operator grasps the handheld actuator 38 and actuates the lift 18 thereby extending it upwardly as shown in FIG. 1 so that the rug 14 is elevated toward the mounting bar 44 of the display rack 46. After the lift 18 is extended and the rug 14 is positioned near the mounting bar 44, the operator may safely climb a separate ladder (not shown) or the like so that the free edge 42 of the rug 14 can be clipped or otherwise fastened to the mounting bar 44. Once this is accomplished, the operator descends the ladder and slowly lowers the lift 18 and carriage 12 by operating the handheld actuator 38. As the carriage 12 is lowered, the rug 14 unrolls into the generally planar display orientation while being suspended from the upper mounting bar 44 of the display rack 46. Once the carriage 12 is fully lowered, depending on the length of the rug 14, it may be necessary to slide the rug hoist 10 from beneath the rug 14 and allow the remaining portion of the rug 14 to unroll.

As can be seen from the above description of the rug hoist apparatus and method of use to suspend an area rug from an elevated display rack, a single operator can safely, efficiently, conveniently and quietly attach the area rug to the elevated display rack. Furthermore, the operation may be accomplished without disrupting the normal activities of retail sales on the showroom.

From the above disclosure of the general principles of the present invention and the preceding detailed description of a preferred embodiment, those skilled in the art will readily comprehend the various modifications to which this invention is susceptible. Therefore, I desire to be limited only by the scope of the following claims and equivalents thereof.

I claim:

1. A method of hanging a rolled rug in a generally planar and vertical orientation on an elevated display rack, the method comprising:

placing the rolled rug onto a carriage of a hoist;

raising the carriage and the rolled rug thereon upwardly toward the elevated display rack;

attaching a free edge of the rolled rug to the display rack; and lowering the carriage and thereby unrolling the rolled rug into the planar and vertical orientation for display.

2. The method of claim 1 further comprising:

rolling the rug into a tubular configuration prior to placing the rug onto the carriage.

3. The method of claim 2 wherein the placing of the rolled rug comprises sliding the rolled rug over a plurality of rollers mounted on the carriage.

4. The method of claim 1 wherein the attaching of the free edge of the rug comprises clamping the free edge to a mounting bar of the display rack with a plurality of clips.

5. The method of claim 1 further comprising:

pivoting the carriage to a generally horizontal operational position from a generally vertical storage position.

6. The method of claim 5 further comprising:

releasably locking the carriage in the generally horizontal operational position.

7. The method of claim 1 further comprising:

pivoting the carriage to a generally vertical storage position from a generally horizontal operational position after the carriage has been lowered and the rug unrolled into the planar and vertical orientation for display.

8. The method of claim 7 further comprising:

releasably locking the carriage in the generally vertical storage position.

9. The method of claim 1 further comprising:

partially unrolling the rolled rug to expose the free edge of the rolled rug prior to attaching the free edge to the display rack.

10. A method of hanging a rug in a generally planar and vertical orientation on an elevated display rack, the method comprising:

rolling the rug into a tubular configuration;

placing the rolled rug onto a carriage by sliding the rolled rug over a plurality of rollers on the carriage;

extending a telescoping lift upon which the carriage is mounted and thereby raising the carriage and rug thereon upwardly toward the elevated display rack;

attaching a free edge of the rolled rug to the display rack; and retracting the telescoping lift and thereby lowering the carriage and unrolling the rug into the planar and vertical orientation for display.

11. The method of claim 10 wherein the attaching of the free edge of the rolled rug comprises clamping the free edge to a mounting bar of the display rack with a plurality of clips.

12. The method of claim 10 further comprising:

pivoting the carriage to a generally horizontal operational position from a generally vertical storage position.

13. The method of claim 12 further comprising:

releasably locking the carriage in the generally horizontal operational position.

14. The method of claim 10 further comprising:

partially unrolling the rolled rug to expose the free edge of the rolled rug prior to attaching the free edge to the display rack.

15. The method of claim 10 further comprising:

pivoting the carriage to a generally vertical storage position from a generally horizontal operational position after the carriage has been lowered and the rag unrolled into the planar and vertical orientation for display.

16. The method of claim 15 further comprising:

releasably locking the carriage in the generally vertical storage position.

* * * * *